Oct. 15, 1957 R. H. WISE 2,809,388
WINDSHIELD WIPER
Filed May 29, 1953
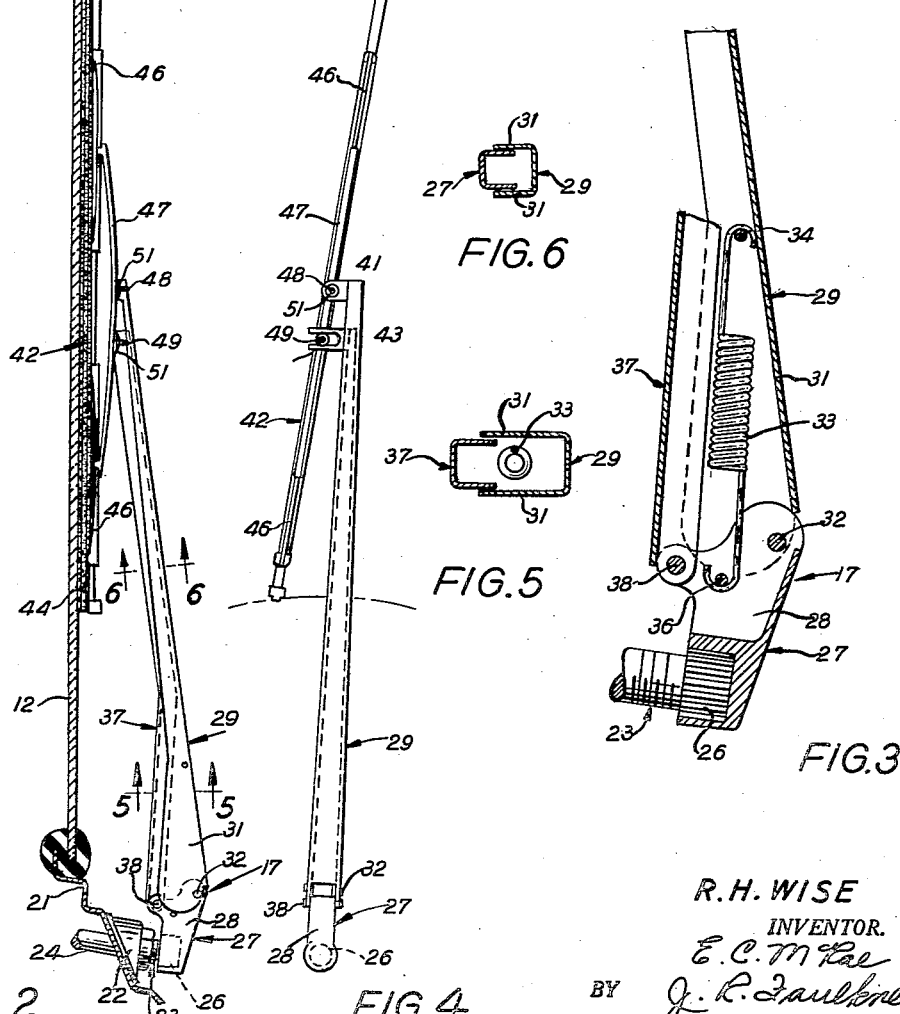
R. H. WISE
INVENTOR.

United States Patent Office 2,809,388
Patented Oct. 15, 1957

2,809,388
WINDSHIELD WIPER

Ralph H. Wise, Wayne, Mich., assignor to Ford Motor Company, Dearborn, Mich., a corporation of Delaware Application May 29, 1953, Serial No. 358,235

4 Claims. (Cl. 15—255)

This invention relates generally to windshield wipers for motor vehicle bodies, and has particular reference to a windshield wiper mechanism for driving a windshield wiper blade in a predetermined path.

An object of the invention is to provide a windshield wiper mechanism having relatively movable primary and secondary arms connected to a windshield wiper blade and controlled in such manner as to move the windshield wiper blade in a predetermined pattern as the windshield wiper blade is moved throughout its cycle of oscillation.

A further object is to provide maximum coverage of the windshield by the wiper blade as well as to orient the wiper blade in such manner as to provide more efficient wiping action in the various areas of a curved windshield.

These and other objects are accomplished by providing a primary arm mounted upon and driven by a rotatable pivot shaft, and a secondary arm adapted to be moved lengthwise relative to said primary arm. The primary arm is pivotally supported upon the pivot shaft for rotation about an axis extending at right angles to the axis of the pivot shaft and spring means are provided to constantly urge the primary arm toward the windshield. The windshield wiper blade is connected at spaced points to the outer ends to the primary and secondary arms, and the inner end of the secondary arm is supported upon the pivot shaft at a point spaced from the pivotal connection between the primary arm and the pivot shaft.

The arrangement is such that the windshield wiper blade, being constantly urged into engagement with the windshield by the spring means, is swung in a fore and aft direction longitudinally of the vehicle as the blade traverses the various curved portions of the windshield. This swinging movement of the primary and secondary arms results in relative lengthwise movement between the arms which in turn varies the inclination of the windshield wiper blade relative to the primary arm. The variation in the inclination of the wiper blade with respect to the primary arm causes the blade to traverse the surface of the windshield in such manner as to minimize the bending of the blade necessary to conform to the curvature of the windshield surface and also enables the area of the windshield wiped by the blade to be increased.

Other objects and advantages of this invention will be made more apparent as this description proceeds, particularly when considered in connection with the accompanying drawings, wherein:

Figure 1 is a semidiagrammatical front elevational view of the windshield and windshield wiper mechanism of a motor vehicle embodying the present invention.

Figure 2 is an enlarged vertical cross sectional view, showing the windshield wiper mechanism in elevation, taken substantially on the plane indicated by the line 2—2 of Figure 1.

Figure 3 is a vertical cross sectional view of a portion of Figure 2.

Figure 4 is an enlarged front elevational view of the windshield wiper mechanism shown in Figure 2.

Figures 5 and 6 are enlarged cross sectional views taken on the planes indicated by the lines 5—5 and 6—6 of Figure 2.

Referring now to the drawing, and particularly to Figure 1, the reference character 12 indicates the curved windshield of a motor vehicle body. In accordance with conventional practice, the windshield 12 has a maximum horizontal curvature in the areas 13 at the sides of the windshield, being swept rearward in these areas to provide greater visibility and to blend with modern styling trends. The central area 16 of the windshield, while curved, is of more moderate curvature. The usual curved windshield, however, is curved only in one direction, horizontally, and vertical elements of the windshield both in the central portion and at the sides are substantially straight.

The vehicle body is provided with a pair of windshield wiper mechanisms 17 and 18, and since these are identical except for being reversed, only one will be described in detail. These windshield wiper mechanisms are both driven by a common power source (not shown) located beneath the vehicle cowl in the conventional manner.

Referring now particularly to Figures 2 and 3, the cowl 21 of the vehicle body has mounted thereon a pivot shaft support 22 rotatably supporting a pivot shaft 23. The inner end 24 of the pivot shaft extends through the cowl panel 21 for connection to the power source, while the drum head 26 at the outer end of the pivot shaft is splined or serrated for connection to a head 27. It will be apparent that the head 27 rotates with the pivot shaft 23 as a unit.

The head 27 has a pair of bifurcated arm portions 28 extending radially outwardly from the axis of the pivot shaft 23. Pivotally connected to the bifurcated portions 28 of the head 27 for rotation about an axis extending at right angles to the axis of the pivot shaft 23 is a primary arm 29. The primary arm 29 forms a radial extension of the head 27 and is U-shaped in cross section with the open side of the U-shaped channel facing the windshield 12. The side walls 31 of the channel shaped primary arm 29 embrace the bifurcated portions 28 of the head 27, being pivotally connected thereto by means of a pivot pin 32. A tension coil spring 33 is located within the channel section of the primary arm 29, being connected at its outer end to a pin 34 extending between the side walls 31 of the primary arm and at its inner end to a pin 36 extending between the bifurcated portions 28 of the head 27. Since the coil spring is offset relative to the pivotal connection 32 between the primary arm and the head, it will be seen that the spring exerts a yieldable force constantly urging the primary arm 29 toward the windshield 12.

A secondary arm 37, also channel-shaped in cross section, is located adjacent the primary arm 29 in close proximity thereto and on the side of the primary arm toward the windshield. As best seen in Figures 5 and 6, the channel-shaped secondary arm 37 is smaller than the channel-shaped primary arm 29, and the two arms are arranged in telescopic overlapping relationship with their open sides facing each other.

At its inner end the secondary arm 37 is pivotally connected to the bifurcated portions 28 of the head 27 by means of a pivot pin 38 extending parallel to the pivot pin 32 and being disposed at right angles to the axis of the pivot shaft 23. It will also be noted that the pivotal connection 38 between the secondary arm 37 and the head 27 is spaced a predetermined distance toward the windshield from the pivotal connection 32 between the primary arm 29 and the head.

With reference now to Figures 2 and 4, it will be seen that the primary and secondary arms 29 and 37 extend in telescopic relationship throughout substantially their entire length. The primary arm 29 is somewhat longer than the secondary arm 37 and is formed at its end with a laterally offset integral flange 41 for connection to a windshield wiper blade 42. The shorter secondary arm 37 is likewise formed at its outer end with a laterally offset integral flange 43, the flange 43 being somewhat longer than the flange 41.

The windshield wiper blade 42 is generally conventional in construction and includes a flexible rubber element 44 connected by yokes 46 to a main supporting yoke 47 so as to be flexible to conform to the variable curvature of the windshield as the blade is oscillated. Pins 48 and 49 are carried by the main supporting yoke 47 of the wiper blade assembly and are spaced from each other a predetermined distance along the length of the yoke. The pins 48 and 49 are arranged to project through apertures formed in the outer ends of the projecting flanges 41 and 43 to permit rotation between the outer ends of the primary and secondary arms and spaced portions of the wiper blade. The pins 48 and 49 extend generally parallel to the axis of the pivot shaft 23. Push-on nuts 51 sleeve over the pins 48 and 49 to retain the blade and arms in assembled relationship.

Upon reference to Figure 4 it will be seen that the pins 48 and 49 projecting from the wiper blade 42 through the offset flanges of the primary and secondary blades are offset different distances from the lengthwise center line of the arms. Specifically, the pin 48 connecting the blade to the primary arm 29 is closer to the arms than is the pin 49 connecting the blade to the secondary arm 37. Consequently, the blade 42 is disposed at a small angle to the arms 29 and 37. As a result of this arrangement, lengthwise movement of the secondary arm 37 relative to the primary arm 29 results in varying the angular relationship between the blade and the arms. For example, if the secondary arm 37 is moved outwardly relative to the primary arm 29, the pivotal connection 49 is moved radially outwardly from the axis of the pivot shaft 23 relative to the pivotal connection 48, and the windshield wiper blade 42 is swung in a clockwise direction from the position shown in Figure 4, thus increasing the angle between the blade and the arms. If, on the other hand, the secondary arm 37 is moved radially inwardly the angle between the blade and the arms is decreased.

Due to the offset relationship between the pivotal connections 32 and 38 between the inner ends of the primary and secondary arms 29 and 37 respectively and the head 27, lengthwise relative movement occurs between the primary and secondary arms as the primary arm 29 is swung about the axis of the pivot pin 32. This swinging movement of the primary arm occurs during the oscillation of the windshield wiper blade over the windshield due to the curvature of the windshield. For example, since the windshield 12 is curved rearwardly from its central portion 16 to its side portions 13, oscillation of the windshield wiper blade from the center of the windshield outwardly toward the side of the windshield results in the windshield wiper blade 42 and the primary arm 29 being swung rearwardly since the coil spring 33 constantly maintains the blade in engagement with the windshield. Conversely, as the windshield wiper blade is moved from a position adjacent the side of the windshield toward the center of the windshield the curvature of the windshield forces the blade and arms in a forward direction. There is, therefore, relative lengthwise movement between the primary and secondary arms as the windshield wiper blade traverses portions of the curved windshield. The inclination of the windshield wiper blade relative to the primary arm 29 is thus varied in a predetermined pattern, and the blade is angularly positioned in the various portions of the cleaned area in such manner as to minimize the bending of the blade necessary to conform to the curvature of the windshield surface and to therefore afford more efficient wiping action.

Referring again to Figure 1, the successive positions of the windshield wiper blade 42 as it moves from the vertical position shown in this view toward the side of the windshield are generally vertical. Since the vertical elements of the curved windshield 12 in this area are substantially straight, it will be apparent that the windshield wiper blade need only bend or flex slightly in order to efficiently wipe the surface of the windshield. A better cleaning job is thus obtained than with a conventional arrangement in which the blade extends diagonally across this curved area of the windshield. In addition, the lower extremity of the windshield wiper blade 42 is advanced closer to the side edge of the windshield to clean a greater area of the windshield.

The pattern of movement of the windshield wiper blade can be varied by changing the relationship between the pivotal connections between the inner ends of the primary and secondary arms and the head, and also by changing the relationship between the pivotal connections between the outer ends of the primary and secondary arms and the blade.

It will be understood that the invention is not to be limited to the exact construction shown and described, but that various changes and modifications may be made without departing from the spirit and scope of the invention, as defined in the appended claims.

What is claimed is:

1. A windshield wiper assembly for cleaning a curved windshield of a vehicle body, comprising a power driven pivot shaft rotatably mounted upon said body, a head upon said pivot shaft for rotation therewith, a primary arm mounted upon said head and pivotally connected thereto for rotation about an axis extending at right angles to the axis of said pivot shaft for swinging movement in a direction longitudinally of the vehicle, a spring between said primary arm and said head urging said primary arm toward said windshield, a secondary arm between said primary arm and said windshield, a wiper blade adapted to clean said windshield located between said arms and said windshield and having two spaced points of connection to the outer ends of said primary and secondary arms, and means connecting the inner end of said secondary arm to said head at a point located between the pivotal connection of said primary arm to said head and said windshield to move said secondary arm lengthwise of said primary arm upon swinging movement of said primary arm in a direction longitudinally of the vehicle as the wiper blade traverses said curved windshield.

2. A windshield wiper assembly for cleaning a curved windshield of a vehicle body, comprising a power driven rotatable pivot shaft mounted upon said body, a head mounted upon said pivot shaft exteriorly of said body and projecting radially a short distance therefrom, a primary arm mounted upon said head for rotation therewith about the axis of said pivot shaft, said primary arm being pivotally connected to the radially extending portion of said head for pivotal movement relative to said head about an axis extending at right angles to the axis of said pivot shaft, a spring having its opposite ends connected to said primary arm and to said head to constantly urge said primary arm toward said windshield about the pivotal connection between said primary arm and said head, a secondary arm extending lengthwise of said primary arm in close proximity thereto and located on the side of said primary arm toward said windshield, means connecting the inner end of said secondary arm to said head at a point spaced from the pivotal connection of said primary arm to said head and located between said last mentioned pivotal connection and said windshield, a wiper blade adapted to clean said windshield located between said arms and said windshield and having spaced points of connection to the outer ends of said primary and secondary arms, said last mentioned points of connection being so located that a line through said points of connection extends at an angle to said primary arm so that lengthwise movement of said secondary arm relative to said primary arm resulting from swinging movement of said primary arm about its pivotal connection with said head causes angular movement of said wiper blade about the connection between said wiper blade and said primary arm.

3. The structure defined by claim 2 which is further characterized in that said secondary arm is shorter than said primary arm and is connected to said wiper blade at a point laterally offset from said primary arm and located a shorter radial distance from the axis of said pivot shaft than the point of connection between said primary arm and said wiper blade.

4. A windshield wiper assembly for cleaning a curved windshield of a vehicle body, comprising a power driven pivot shaft rotatably mounted upon said body adjacent one edge of said windshield, a head mounted upon said pivot shaft for rotation therewith as a unit and having a supporting portion extending radially outwardly from said pivot shaft, primary and secondary arms pivotally connected to the radially outwardly extending supporting portion of said rotatable head about axes extending parallel to each other and at right angles to the axis of said pivot shaft, the pivotal connections of said primary and secondary arms to the supporting portion of said head being spaced from each other axially of said pivot shaft, a wiper blade, said primary and secondary arms being connected at their outer ends to said wiper blade at spaced points, and spring means urging said blade into engagement with said curved windshield so that said primary and secondary arms are rocked about their pivotal connections to said rotatable head as the wiper blade traverses the curved windshield to effect angular movement of said blade relative to said arms.

References Cited in the file of this patent

UNITED STATES PATENTS

| | | |
|---|---|---|
| 2,232,757 | Zeder | Feb. 25, 1941 |
| 2,324,894 | Whitted | July 20, 1943 |
| 2,356,424 | Paton | Aug. 22, 1944 |
| 2,376,012 | Sacchini | May 15, 1945 |